United States Patent
Numata et al.

(10) Patent No.: US 12,461,597 B2
(45) Date of Patent: Nov. 4, 2025

(54) WORK SUPPORT SYSTEM AND WORK SUPPORT METHOD

(71) Applicant: Hitachi, Ltd., Tokyo (JP)

(72) Inventors: Takashi Numata, Tokyo (JP); Kazuyuki Tajima, Tokyo (JP); Keiichi Mitani, Tokyo (JP); Toshiteru Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 259 days.

(21) Appl. No.: 18/116,598

(22) Filed: Mar. 2, 2023

(65) Prior Publication Data
US 2023/0333661 A1 Oct. 19, 2023

(30) Foreign Application Priority Data
Apr. 13, 2022 (JP) .................. 2022-066498

(51) Int. Cl.
*G06F 3/01* (2006.01)
*G06F 3/04815* (2022.01)
*G06T 19/20* (2011.01)

(52) U.S. Cl.
CPC .......... *G06F 3/017* (2013.01); *G06F 3/04815* (2013.01); *G06T 19/20* (2013.01); *G06T 2200/24* (2013.01); *G06T 2219/2016* (2013.01)

(58) Field of Classification Search
CPC ..... G06F 3/017; G06F 3/04815; G06T 19/20; G06T 2200/24; G06T 2219/2016
See application file for complete search history.

(56) References Cited

U.S. PATENT DOCUMENTS

| 2014/0024157 | A1 | 1/2014 | Kim et al. | |
| 2014/0241575 | A1* | 8/2014 | Lee | G06V 20/20 |
| | | | | 382/103 |
| 2014/0364209 | A1* | 12/2014 | Perry | A63F 13/71 |
| | | | | 463/31 |
| 2016/0277710 | A1 | 9/2016 | Oyama | |

(Continued)

FOREIGN PATENT DOCUMENTS

| CN | 111596757 A | 8/2020 |
| CN | 113407035 A | 9/2021 |

(Continued)

OTHER PUBLICATIONS

KR Office Action dated Jan. 28, 2025 directed to the KR counterpart application No. 10-2023-0028202, in 11 pages, (with translation).

(Continued)

*Primary Examiner* — Michelle L Sams
(74) *Attorney, Agent, or Firm* — PROCOPIO, CORY, HARGREAVES & SAVITCH LLP (57) ABSTRACT

An arithmetic apparatus displays a 3D work-target object in a 3D coordinate space on a display device, and receives a motion signal that is a signal representing a motion measured by any one of sensor units. When receiving the motion signal, the arithmetic apparatus identifies the measured motion based on the motion signal. When the identified motion is a motion regarding a spatial shift that is a shift of a viewpoint in the 3D coordinate space of a user, the arithmetic apparatus shifts the viewpoint in the 3D coordinate space of the user in accordance with the identified motion. When the identified motion is a hand motion regarding a work movement with respect to a work target, the arithmetic apparatus outputs output information including information representing the work movement in accordance with the identified motion.

9 Claims, 5 Drawing Sheets

(56) References Cited

U.S. PATENT DOCUMENTS

| 2018/0184000 A1* | 6/2018 | Lee ..................... G06F 3/0484 |
| 2019/0018479 A1 | 1/2019 | Minami |
| 2021/0004195 A1 | 1/2021 | Ohno et al. |
| 2023/0123518 A1* | 4/2023 | Sharma .............. G06Q 30/0601 |
| | | 345/632 |

FOREIGN PATENT DOCUMENTS

| JP | 2006-209563 A | 8/2006 |
| JP | 2018-200557 A | 12/2018 |
| JP | 2021-10101 A | 1/2021 |
| WO | 2015/060393 A1 | 4/2015 |

OTHER PUBLICATIONS

Jun-Seong, Bang et al., "Trends in Remote Collaboration Technology for Virtual and Augmented Reality", Electronics and Telecommunications Trends, https://ettrends.etri.re.kr, 2017, in 18 pages (with translation).

Lim, Young-Jae et al., "Hand Gesture Recognition in the Virtual Space based on Deep Learning", Journal of Digital Contents Society, vol. 21, No. 3, pp. 471-478, Mar. 2020, 16 pages (with translation).

Taiwan Office Action dated May 3, 2024 directed to the TW counterpart application No. 112108204, in 17 pages (with translation).

Japanese Office Action issued in corresponding JP Application No. 2022-066498, dated Sep. 9, 2025, in 11 pages (with translation).

\* cited by examiner

| TYPE OF MOTION | TYPE OF MOVEMENT | CURRENT |
|---|---|---|
| REMOTE CONTROLLER | SPATIAL SHIFT | 0 |
| HAND | WORK MOVEMENT | 1 |
| PUSHING-DOWN REMOTE CONTROLLER SWITCH | SWITCHING MOVEMENT | - |

FIG. 7

WORK SUPPORT SYSTEM AND WORK SUPPORT METHOD

BACKGROUND

The present invention generally relates to a technique for work support.

DESCRIPTION OF THE RELATED ART

In general, an experienced person (an example of a supporter) supports the work of an inexperienced person (an example of a support recipient). As an example of a technique related to work support, the techniques disclosed in PLT 1 and PLT 2 have been known.

According to PLT 1, an image of a work site of a worker (an example of a support recipient) is provided from a peripheral imaging apparatus to an administrator (an example of a supporter) located at a remote site. The administrator gives a work instruction to the worker based on this image.

According to PLT 2, a hand motion of an experienced person (an example of a supporter) is superimposed on an image of a field of view of a worker (an example of a support recipient).

PLT 1: JP2021-10101
PLT 2: WO2015/060393

SUMMARY

According to PLT 2, it is possible to provide work support using a hand motion. However, an image provided to the supporter is an image of the field of view of the worker, and therefore the field of view of the supporter is limited to the field of view of the worker.

In the meantime, according to PLT 1, it is possible to scroll an image of the peripheral imaging apparatus based on the movement of the administrator, that is, to shift the viewpoint of the administrator. However, also in Patent Document 1, the field of view of the supporter is limited, specifically, limited to an imaging range of the peripheral imaging apparatus. In addition, this work support is not one using a hand motion.

A work support system includes: a display device; one or more sensor units that measure a motion of a user (typically a supporter); and an arithmetic apparatus. The arithmetic apparatus displays a 3D work-target object in a 3D coordinate space on the display device and receives a motion signal that is a signal representing a motion measured by any one of sensor units. When receiving the motion signal, the arithmetic apparatus identifies the measured motion based on the motion signal. When the identified motion is a motion regarding a spatial shift that is a shift of a viewpoint in the 3D coordinate space of a user, the arithmetic apparatus shifts the viewpoint in the 3D coordinate space of the user in accordance with the identified motion. When the identified motion is a hand motion regarding a work movement with respect to a work target, the arithmetic apparatus outputs output information including information representing the work movement in accordance with the identified motion.

According to the present invention, it is possible to realize both a viewpoint shift desired by a user and work support using a hand motion.

DESCRIPTION OF THE EMBODIMENTS

In the following description, an "interface apparatus" may be one or more interface devices. The one or more interface devices may be at least one of the following.

An I/O (input/output) interface apparatus that is one or more I/O interface devices. The I/O (input/output) interface device is an interface device for at least one of an I/O device and a remote display computer. The I/O interface device for the display computer may be a communication interface device. At least one I/O device may be a user interface device, for example, either of an input device such as a keyboard and a pointing device, and an output device such as display device.

A communication interface apparatus that is one or more communication interface devices. One or more communication interface devices may be one or more of communications interface devices of the same type (e.g., one or more NICs (network interface cards)), or two or more communications interface devices of a different type (e.g., an NIC and an HBA (host bus adapter)).

In the following description, a "memory" is one or more memory devices as an example of one or more storage devices, and may typically be a primary memory device. At least one memory device in a memory may be a volatile memory device or a non-volatile memory device.

In the following description, a "permanent storage apparatus" may be one or more permanent storage devices as an example of one or more storage devices. The permanent storage device may typically be a non-volatile storage device (e.g., an auxiliary storage device), specifically, for example, an HDD (hard disk drive), an SSD (solid state drive), an NVME (non-volatile memory express) drive, or an SCM (storage class memory).

In the following description, a "storage apparatus" may be at least a memory of a memory and a permanent storage apparatus.

In the following description, a "processor" may be one or more processor devices. At least one processor device may typically be a microprocessor device such as a CPU (central processing unit), and may also be another type of processor device such as a GPU (graphics processing unit). At least one processor device may be a single-core processor device or a multi-core processor device. At least one processor device may be a processor core. At least one processor device may be a processor device in a broad sense, such as a circuit as a collection of gate arrays (e.g., an FPGA (field-programmable gate array), a CPLD (complex programmable logic device), or an ASIC (application specific integrated circuit)) in a hardware description language that performs part or the whole of processing, may also be used.

In the following description, functions may be each described using an expression like a "yyy unit"; however, each function may be realized by executing one or more computer programs by a processor, or may be realized by one or more hardware circuits (e.g., FPGAs or ASICs), or may be realized by a combination thereof. When a function is realized by executing a program by a processor, the defined processing is performed while a storage apparatus and/or an interface apparatus, etc., are appropriately used; thus, the function may be at least a part of the processor. Processing described by using a function as a subject in a sentence may be processing performed by a processor or an apparatus having a processor. A program may be installed from a program source. A program source may include, for example, a program distribution computer or a computer-readable storage medium (e.g., a non-temporary storage medium). The description on each function is an example thereof, and a plurality of functions may be combined into one function, or one function may be divided into a plurality of functions.

Further, in the following description, when similar elements are described without being distinguished, only common reference numerals in the reference numerals may be used, and when similar elements are distinguished from each other, the reference numerals may be used.

Several embodiments will be described below.

First Embodiment

Figure 1:
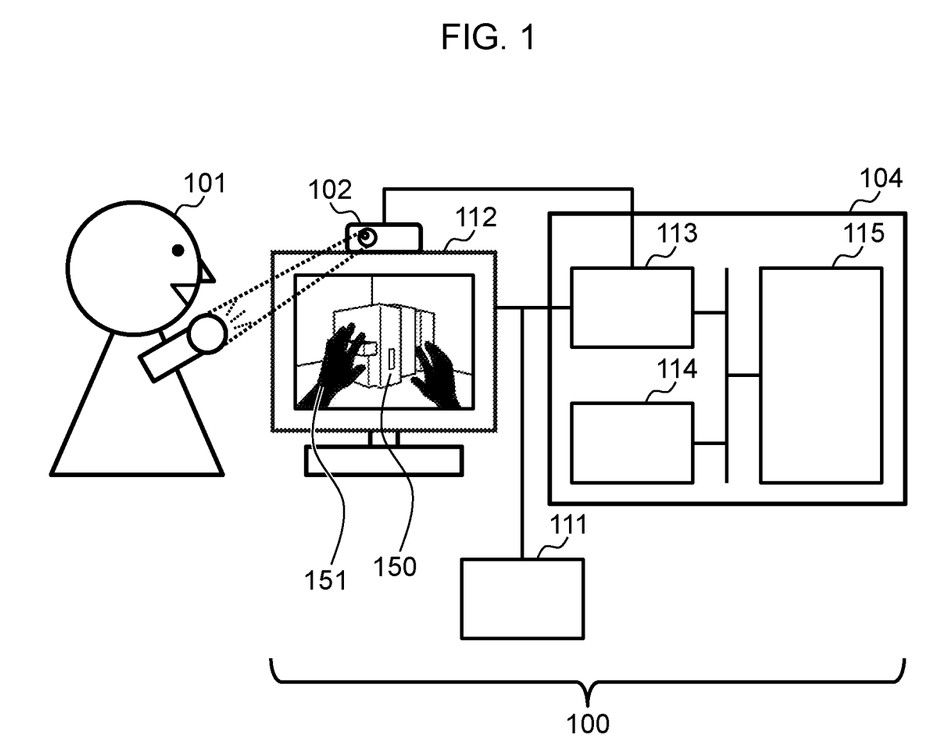
FIG. 1 shows a configuration example of an entire system according to the first embodiment.

FIG. 1 shows a configuration of the entire system related to the first embodiment.

A work support system 100 include: an input device 111; a display device 112; a motion sensor 102; and an arithmetic apparatus 104 communicatively connected to these elements. A computer (for example, a laptop or tablet computer) including the input device 111, the display device 112, and the arithmetic apparatus 104 may be adopted.

The input device 111 may be a keyboard or a pointing device. The display device 112 may be a device having a display, such as a flat panel display, an omnidirectional display, or a hemispherical display.

The motion sensor 102 is an example of a sensor unit that measures a motion of a supporter 101 (an example of a user). The motion sensor 102 transmits (for example, wirelessly transmits) a motion signal representing the measured motion.

The arithmetic apparatus 104 includes: an interface apparatus 113; a storage apparatus 114; and a processor 115 connected to these elements. The interface apparatus 113 communicates with the input device 111, the display device 112, and the motion sensor 102. The storage apparatus 114 stores information illustrated in FIG. 2 and computer programs for realizing the functions illustrated in FIG. 2. The processor 115 executes the computer programs.

The arithmetic apparatus 104 displays a 3D work-target object 150 in a 3D coordinate space on the display device 112. The work-target object 150 is an object representing a work target such as a machine.

The arithmetic apparatus 104 receives a motion signal representing a motion measured by the motion sensor 102 (and by a remote controller described later).

When receiving a motion signal, the arithmetic apparatus 104 identifies the measured motion based on the motion signal. When the identified motion is a motion regarding a spatial shift, the arithmetic apparatus 104 shifts a viewpoint in the 3D coordinate space of the supporter 101 in accordance with the identified motion. When the identified motion is a hand motion regarding a work movement with respect to a work object, the arithmetic apparatus 104 outputs output information including information representing the work movement in accordance with the identified motion.

According to the arithmetic apparatus 104 described above, it is possible to realize both the viewpoint shift desired by the supporter and the work support using a hand motion. Specifically, the viewpoint of the supporter 101 is shiftable within the range of a 3D coordinate space where the work-target object 150 is arranged. In addition, the motion regarding the work movement for the work target is a hand motion.

The arithmetic apparatus 104 may display a 3D hand object 151 of one or both hands, in addition to the work-target object 150. Either the work-target object 150 or the hand object 151 may have any format (e.g., a raster format or a vector format).

One or more cameras are provided at a site where a support recipient (e.g., an inexperienced worker) and a work target of the support recipient (e.g., a machine) are present, and a 3D model of the site (e.g., a 3D object of the site including the work target) may be generated based on one or more images imaged by the above one or more cameras, and the 3D model including the work-target object 150 may be displayed on the display device 112. Alternatively, the work-target object 150 may be an object created in advance using software such as CAD software.

As one or more sensor units, at least the motion sensor 102 is adopted in the present embodiment; however, instead of or in addition to the motion sensor 102, a sensor glove (e.g., a glove-type sensor unit having a pressure sensor, a microphone, etc.) may be adopted, or a wearable sensor unit other than the sensor glove may be adopted, or another sensor unit of a contact or non-contact type may be adopted.

The present embodiment will be described in detail below.

Figure 2:
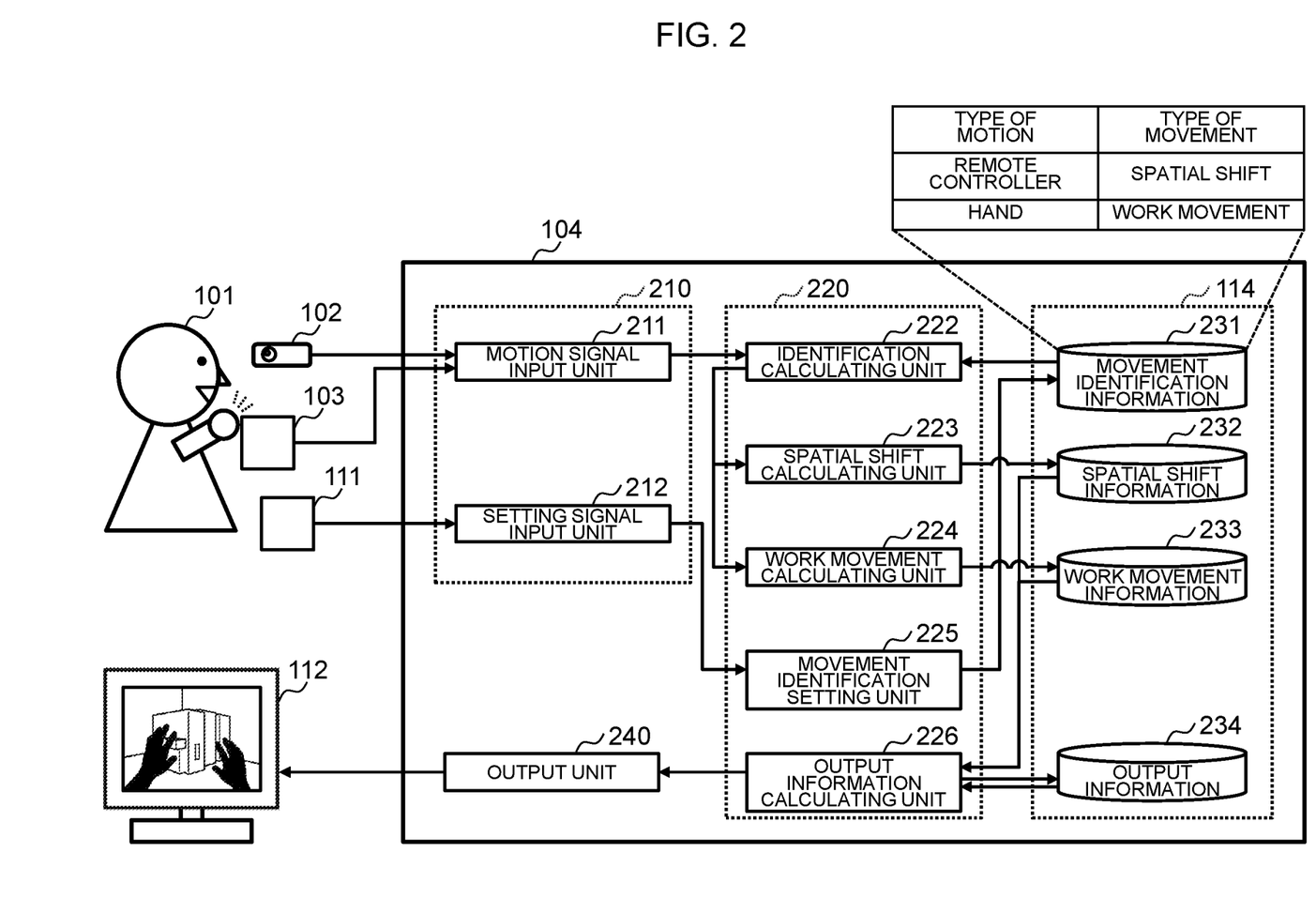
FIG. 2 shows functional blocks of an arithmetic apparatus according to the first embodiment.

FIG. 2 shows functional blocks of the arithmetic apparatus 104.

The storage apparatus 114 stores movement identification information 231, spatial shift information 232, work movement information 233, and output information 234.

The movement identification information 231 includes information representing the correspondence between the type of motion and the type of movement. In the present embodiment, a "movement" is an action as a purpose of the supporter 101, and a "motion" is a behavior as means for achieving the purpose of the supporter 101. According to the example shown in FIG. 2, the supporter 101 (e.g., an experienced person) performs a motion using the remote controller 103 for a spatial shift. In addition, the supporter 101 performs a hand motion for a work (work support). The remote controller 103 includes a sensor set (one or more sensors) and a wireless communication device. The remote controller 103 measures a motion through the sensor set, and wirelessly transmits a motion signal of the measured motion through the wireless communication device.

The spatial shift information 232 includes information representing a calculated spatial shift. The spatial shift is shifting the viewpoint of the supporter 101 in the 3D coordinate space. In the spatial shift, one of the 3D coordinate space and the viewpoint may be fixed and the other may be movable. The spatial shift information 232 may include, for each spatial shift, information representing start point coordinates and end point coordinates of the viewpoint, and a velocity of the viewpoint shift from the start point coordinates to the end point coordinates.

The work movement information 233 includes information representing a calculated work movement. The work movement is a movement of a work with respect to the work target. The work movement information 233 may include, for each work movement, information representing coordinates of a 3D hand object representing a hand (e.g., positional coordinates of each part of a hand object), the shape and the animation of the hand object, for left and right hands.

The output information 234 includes output information on an output target. For example, the output information 234 may include, for time from a first time point to a second time point, information representing one or more spatial shifts, information representing one or more work movements, and information representing the animation of the work-target object. For example, the output information 234 may be information as a work manual for the support recipient (e.g., the inexperienced person).

Functions of an input unit 210, an arithmetic unit 220, an output unit 240, etc., are realized by executing computer programs by the processor 115. The input unit 210 includes a motion signal input unit 211 and a setting signal input unit 212. The arithmetic unit 220 includes an identification calculating unit 222, a spatial shift calculating unit 223, a work movement calculating unit 224, a movement identification setting unit 225, and an output information calculating unit 226. Hereinafter, the flow of the processing will be described together with the description on each function.

The setting signal input unit 212 receives an input of the movement identification information from the input device 111 and inputs the received movement identification information to the arithmetic unit 220. The movement identification setting unit 225 receives the input of the movement identification information and stores this movement identification information 231 in the storage apparatus 114.

The output information 234 includes information regarding the work-target object and the hand object. The output information calculating unit 226 reads the information on the work-target object from the output information 234, and the output unit 240 displays the work-target object 150 on the display device 112.

The supporter 101 performs a motion for a work or a spatial shift with respect to the work-target object 150. As described above, specific description thereof is as follows.

The supporter 101 performs a motion using the remote controller 103 for the spatial shift (to change the viewpoint with respect to the work-target object 150). The remote controller 103 measures the motion and transmits a motion signal of the measured motion.

The supporter 101 performs a hand motion for the work movement. The motion sensor 102 measures the motion and transmits a motion signal of the measured motion.

The motion signal input unit 211 receives the motion signal from the motion sensor 102 or the remote controller 103, and inputs the received motion signal to the arithmetic unit 220. The identification calculating unit 222 receives the input of the motion signal and identifies the type of the measured motion from the motion signal. The identification calculating unit 222 identifies the type of movement corresponding to the identified type of motion from the movement identification information 231. For example, when the identified type of motion is a "remote controller", the type of movement: the "spatial shift" is identified. When the identified type of motion is a "hand", the type of movement: the "work movement" is identified.

When the identified type of movement is the "spatial shift", the identification calculating unit 222 identifies that the measured motion is a motion regarding the spatial shift. In this case, the spatial shift calculating unit 223 calculates the spatial shift. Specifically, the spatial shift calculating unit 223 calculates information representing the spatial shift that shifts the viewpoint in the 3D coordinate space of the supporter 101 in accordance with the identified motion, and puts the calculated information into the spatial shift information 232.

When the identified type of movement is the "work movement", the identification calculating unit 222 identifies that the measured motion is a motion regarding the work movement with respect to the work object. When the identified motion is a hand motion regarding the work movement, the work movement calculating unit 224 calculates the work movement. Specifically, the work movement calculating unit 224 calculates information representing the work movement in accordance with the identified motion and puts the calculated information into the work movement information 233.

The output information calculating unit 226 reads, for the received motion signal, the information generated by the spatial shift calculating unit 224 or the work movement calculating unit 223 from the spatial shift information 232 or the work movement information 233. The output information calculating unit 226 puts the information read out into the output information 234 and calculates display information based on the information read out. The output unit 240 reflects a display based on the calculated display information on the display device 112. Accordingly, the display of the display device 112 is updated. Specifically, the viewpoint in the 3D coordinate space is shifted or an animation of the hand object 151 is displayed.

According to the present embodiment, the motion regarding the work movement is a hand motion, and the motion regarding the spatial shift is a motion using the remote controller 103. Accordingly, the arithmetic apparatus 104 can accurately distinguish the type of movement that is targeted by the supporter 101. Note that the motion regarding the spatial shift may be a motion of a part other than a human hand (a part other than a part of the motion target regarding the work movement), instead of the motion using the remote controller 103. For example, the motion regarding the spatial shift may be a motion of moving a head in the shifting direction of the viewpoint.

Second Embodiment

The second embodiment will be described. In this description, differences from the first embodiment will be mainly described, and description on the common points with the first embodiment will be omitted or simplified.

Figure 3:
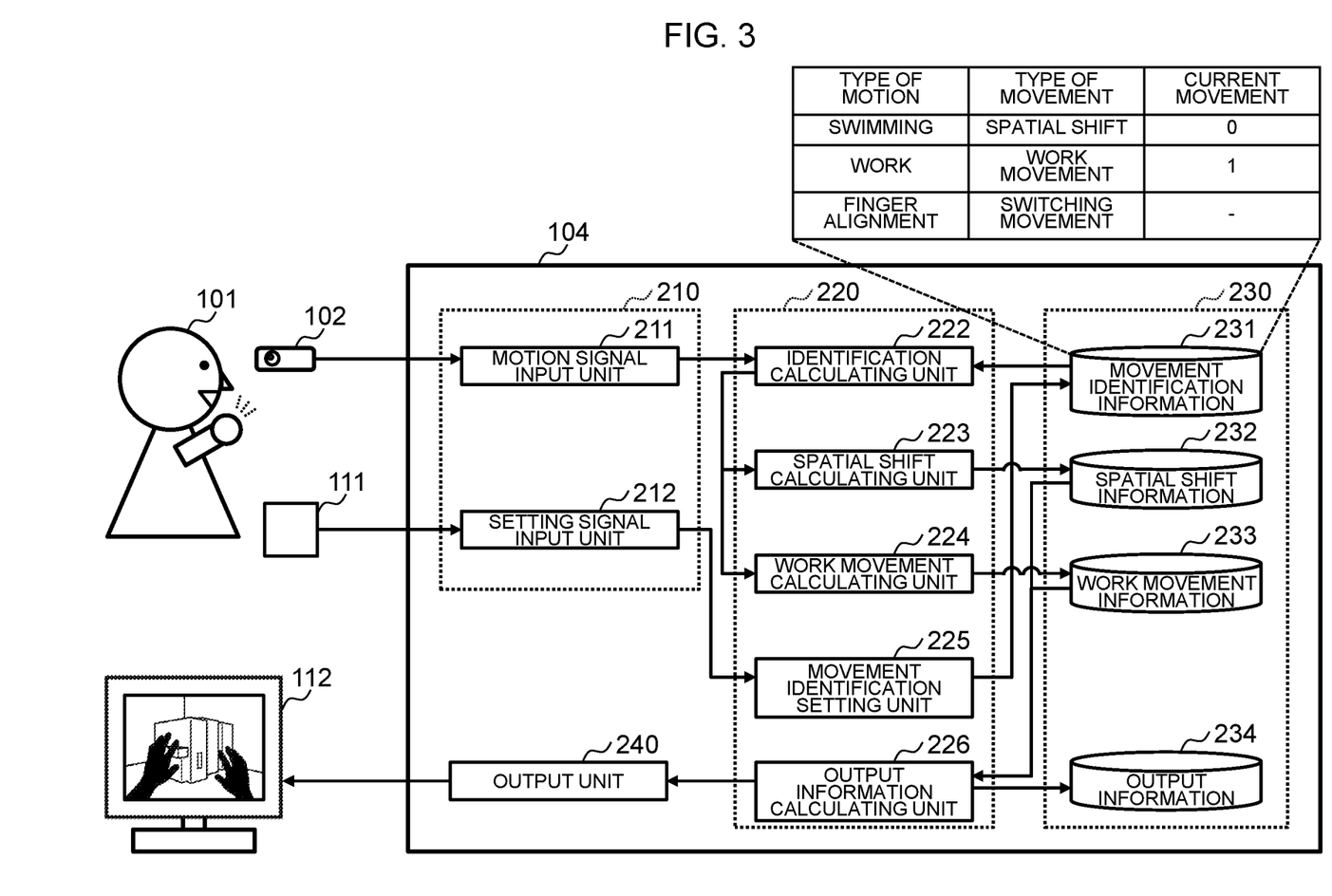
FIG. 3 shows functional blocks of the arithmetic apparatus according to the second embodiment.

FIG. 3 shows functional blocks of the arithmetic apparatus according to the second embodiment.

In the second embodiment, not only the motion regarding the work movement but also the motion regarding the spatial shift are hand motions. When not only the work movement but also the spatial shift are hand motions, the operability (work support performance) for the supporter 101 is enhanced.

However, when not only the work movement but also the spatial shift are hand motions, these motions may overlap; therefore, it might be difficult to distinguish the types of movement.

To cope with this, the motion regarding the spatial shift is a hand motion of a different type from the hand motion regarding the work movement. Accordingly, it can be expected that facilitation of distinguishing the types of movement is enhanced. For example, the hand motion regarding the spatial shift may be either one of the follows:

a hand motion of pointing a fingertip to coordinates of the destination of a viewpoint;

a hand motion that points a circle made with a finger to coordinates of the destination of a viewpoint;

a hand motion that sets a virtual marker at coordinates of the destination of a viewpoint;

a hand motion of moving (swiping) a finger in the direction opposite to the shifting direction of a viewpoint, a motion of moving both hands in the shifting direction of a viewpoint, and a hand motion of moving a hand in a state of being closed (there is no gap between fingers) in the shifting direction of a viewpoint.

In the present embodiment, the hand motion regarding the spatial shift is a motion defined as a swimming motion. The swimming motion is intuitively understandable as a motion for the spatial shift and is unlikely to overlap with a motion for the work movement. For this reason, it can be expected that the operability of the supporter 101 and the facilitation of distinguishing the type of movements are both enhanced. As for the swimming motion, for example, the viewpoint may be shifted in the direction of palm paddling. In other words, moving a palm in the direction opposite to the shifting direction of the viewpoint may be set as the swimming motion.

Further, in the present embodiment, in order to improve the accuracy of distinguishing the types of motion, the type of movement: a "switching movement" is prepared in the movement identification information 231. The "switching movement" is switching between the spatial shift and the work movement. In addition, the movement identification information 231 includes information representing whether the current movement is the spatial shift or the work movement. This information is a flag representing, for each of the types of movement: the "spatial shift" and the "work movement", whether the concerned type of movement is a current movement or not. "1" means the current movement, and "0" means not the current movement.

In the arithmetic apparatus 104, the identification calculating unit 222 identifies the type of the measured motion and identifies the type of movement corresponding to the identified type of motion.

When the identified type of movement is a "switching movement", the identification calculating unit 222 switches the current movement from the spatial shift to the work movement or from the work movement to the spatial shift. For example, when the flag of the spatial shift is "1" and the flag of the work movement is "0", the identification calculating unit 222 updates the flag of the spatial shift to "0" and the flag of the work movement to "1". On the other hand, when the flag of the spatial shift is "0" and the flag of the work movement is "1", the identification calculating unit 222 updates the flag of the spatial shift to "1" and the flag of the work movement to "0".

When the identified type of movement is not the switching movement and the current movement is the spatial shift, the identification calculating unit 222 identifies that the measured motion is a motion regarding the spatial shift.

When the identified type of movement is not the switching movement and the current movement is the work movement, the identification calculating unit 222 identifies that the measured motion is a motion regarding the work movement.

The type of motion corresponding to the switching movement may be finger overlapping, in which at least a part of one hand contacts at least a part of the other hand, for example. That is, the motion regarding the switching movement is also a kind of hand motion. Therefore, the operability becomes higher. Further, the overlapping is unlikely to overlap with the hand motion of either the spatial shift or the work movement. Therefore, it can be expected that the accuracy of distinguishing the types of motion is prevented from deteriorating.

Figure 4:
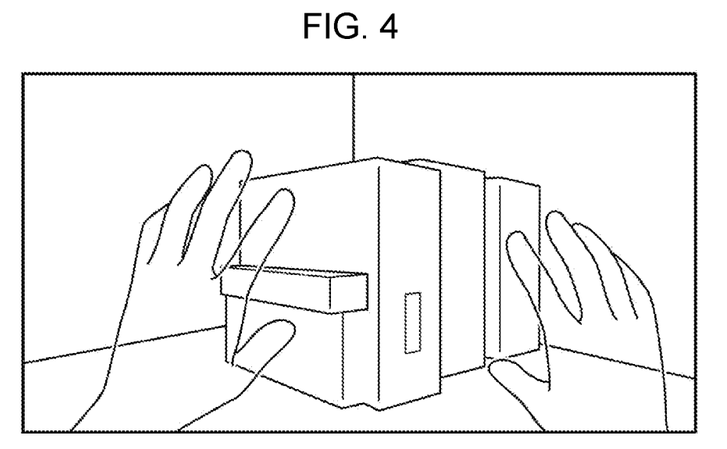
FIG. 4 shows an example of a display mode of a hand object regarding a spatial shift.
Figure 5:
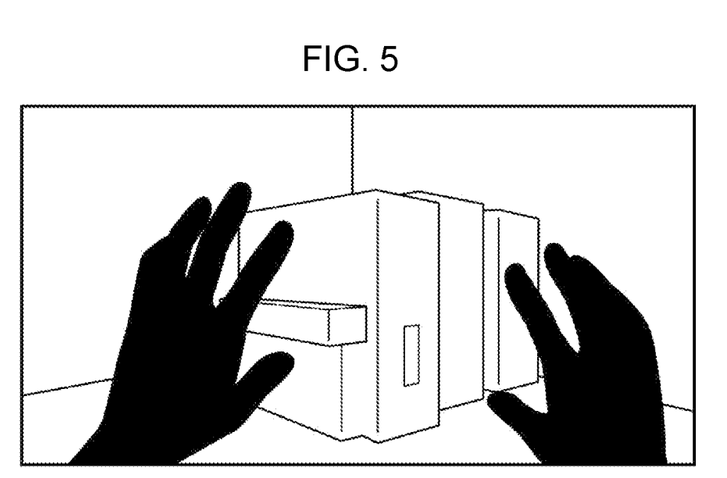
FIG. 5 shows an example of a display mode of a hand object regarding a work movement.

The output unit 240 displays the hand object 151, which is a display object of the hand of the supporter 101, in a 3D coordinate space, and the output unit 240 displays the hand object at the time of a hand motion regarding the spatial shift in a different display mode from the display mode of the hand object at the time of a hand motion regarding the work movement. Accordingly, the supporter 101 can grasp at a glance as which type of movement the hand motion of the supporter 101 is recognized by the arithmetic apparatus 104. For example, the display mode of the hand object at the time of a hand motion regarding the spatial shift may be displayed only in the outline of the hand object (the color of the hand object may be omitted), as illustrated in FIG. 4. The display mode of the hand object at the time of a hand motion regarding the work movement may be displayed such that the hand object is filled in black, as illustrated in FIG. 5.

Figure 6:
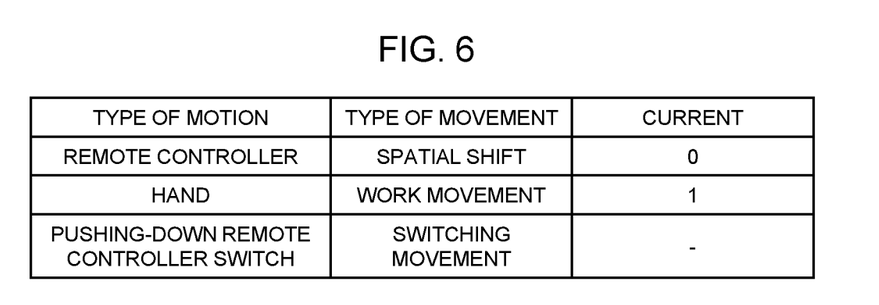
FIG. 6 shows a variant example of movement identification information.

The information representing the type of movement: the "switching movement" or representing which type of movement: the "spatial shift" or the "work movement" is the current movement may be provided in the first embodiment. For example, as shown in FIG. 6, the type of motion corresponding to the switching movement may be pushing down a switch of the remote controller 103 (an example of a predetermined motion using the remote controller 103). Accordingly, it is possible to accurately detect the switching movement and thereby accurately distinguish the types of motion.

Third Embodiment

The third embodiment will be described, hereinafter. In this description, differences from the first embodiment will be mainly described, and description on the common points with the first embodiment will be omitted or simplified.

Figure 7:
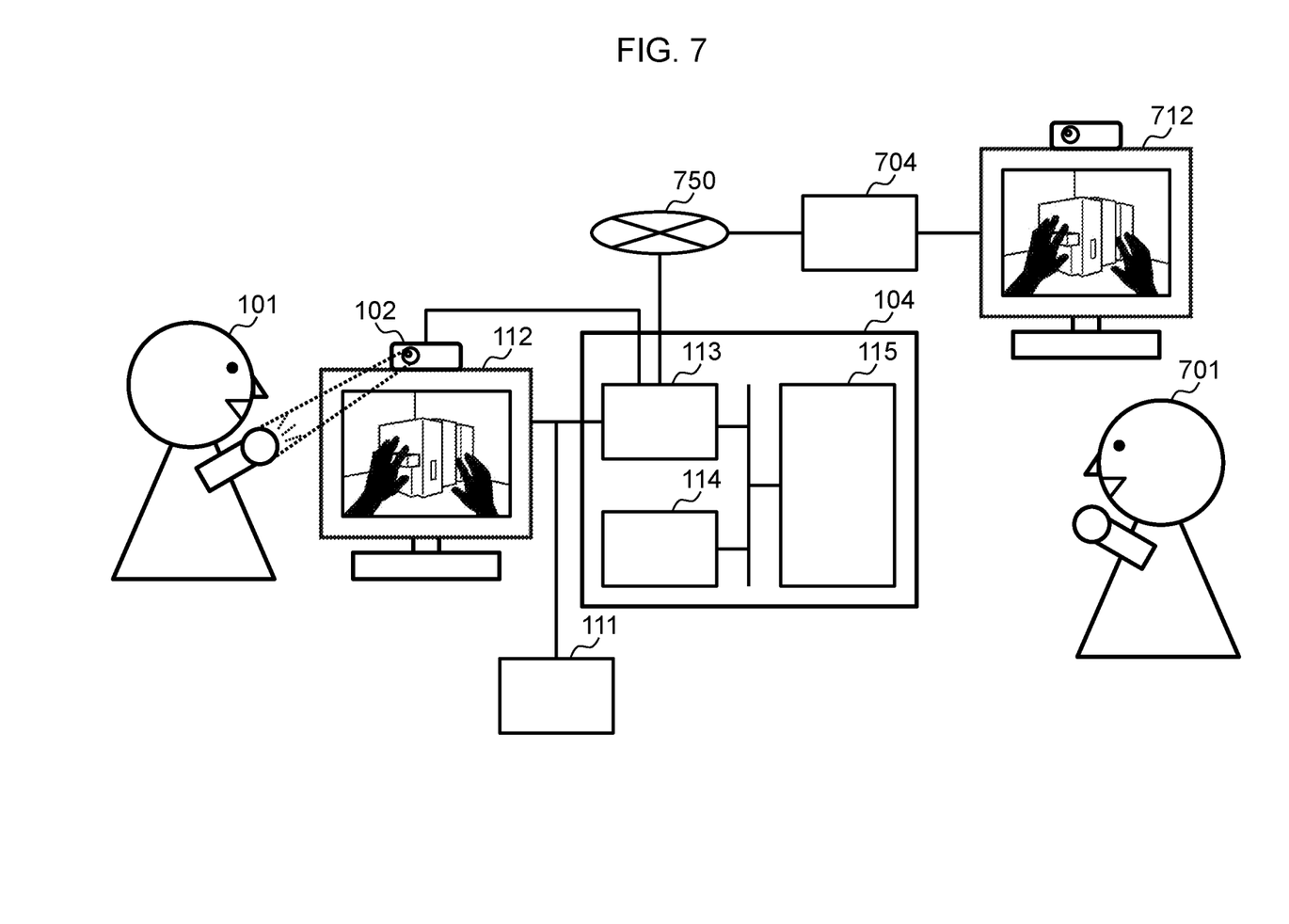
FIG. 7 shows a configuration example of an entire system according to the third embodiment.

FIG. 7 shows a configuration example of the entire system according to the third embodiment.

The interface apparatus 113 of the arithmetic apparatus 104 is communicatively connected via a communication network 750 to a different arithmetic apparatus 704. The different arithmetic apparatus 704 includes a different display device 712. A support recipient 701 views a display on the different display device 712.

The output unit 240 of the arithmetic apparatus 104 outputs the output information 234 to the different arithmetic apparatus 704 via the communication network 750. The different arithmetic apparatus 704 displays the work-target object 150 and the work movement with respect to the work target (e.g., an animation of the hand object 151) based on the received output information. In this manner, it is possible to provide the work support to the supporter recipient 701.

The several embodiments have been described above, these are examples for explaining the present invention, and are not intended to limit the scope of the present invention only to these embodiments. The present invention can also be implemented in various other forms.

What is claimed is:

1. A work support system comprising:
   a display device;
   one or more sensor units that measure a motion of a user; and an arithmetic apparatus that displays a 3D work-target object in a 3D coordinate space on the display device and receives a motion signal that is a signal representing a motion measured by any one of the sensor units, when receiving the motion signal, the arithmetic apparatus:

(A) identifying the measured motion based on the motion signal by:
  (a1) identifying a type of the measured motion;
  (a2) identifying a type of movement corresponding to the identified type of motion;
  (a3) when the identified type of movement is a switching movement of switching between a spatial shift and a work movement, switching a current movement from the spatial shift to the work movement or from the work movement to the spatial shift;
  (a4) when the identified type of movement is not the switching movement and the current movement is the spatial shift, identifying that the measured motion is a motion regarding the spatial shift; and
  (a5) when the identified type of movement is not the switching movement and the current movement is the work movement, identifying that the measured motion is a motion regarding the work movement;
(B) when the identified motion is a motion regarding the spatial shift that is a shift of a viewpoint in the 3D coordinate space of the user, wherein the motion regarding the spatial shift is one of a hand motion or a non-hand motion, shifting the viewpoint in the 3D coordinate space of the user in accordance with the identified motion; and
(C) when the identified motion is a hand motion regarding the work movement with respect to a work target, outputting output information including information representing the work movement in accordance with the identified motion, wherein the sensor units include a remote controller, and wherein the type of motion corresponding to the switching movement is a predetermined motion using the remote controller.

2. The work support system according to claim 1, wherein in step (A), the arithmetic apparatus:
  when the identified type of movement is the spatial shift, identifies that the measured motion is a motion regarding the spatial shift; and
  when the identified type of movement is the work movement, identifies that the measured motion is a motion regarding the work movement.

3. The work support system according to claim 1, wherein the motion regarding the spatial shift is the hand motion when the current movement is the spatial shift.

4. The work support system according to claim 1, wherein the motion regarding the spatial shift is a hand motion of a different type from that of the hand motion regarding the work movement when the current movement is the spatial shift.

5. The work support system according to claim 4, wherein the hand motion regarding the spatial shift is a motion defined as a swimming motion.

6. The work support system according to claim 1, wherein the arithmetic apparatus displays a hand object at a time of the hand motion regarding the spatial shift in a different display mode from a display mode of the hand object at a time of the hand motion regarding the work movement when the respective movements are current movements.

7. The work support system according to claim 1, wherein the arithmetic apparatus outputs the output information to a different arithmetic apparatus connected to the arithmetic apparatus via a communication network, and
based on the output information, the different arithmetic apparatus displays the work-target object and the work movement with respect to the work target on a different display device.

8. A work support system comprising:
a display device;
one or more sensor units that measure a motion of a user; and
an arithmetic apparatus that displays a 3D work-target object in a 3D coordinate space on the display device and receives a motion signal that is a signal representing a motion measured by any one of the sensor units, when receiving the motion signal, the arithmetic apparatus:

(A) identifying the measured motion based on the motion signal by:
  (a1) identifying a type of the measured motion;
  (a2) identifying a type of movement corresponding to the identified type of motion;
  (a3) when the identified type of movement is a switching movement of switching between a spatial shift and a work movement, switching a current movement from the spatial shift to the work movement or from the work movement to the spatial shift;
  (a4) when the identified type of movement is not the switching movement and the current movement is the spatial shift, identifying that the measured motion is a motion regarding the spatial shift; and
  (a5) when the identified type of movement is not the switching movement and the current movement is the work movement, identifying that the measured motion is a motion regarding the work movement;
(B) when the identified motion is a motion regarding the spatial shift that is a shift of a viewpoint in the 3D coordinate space of the user, wherein the motion regarding the spatial shift is one of a hand motion or a non-hand motion, shifting the viewpoint in the 3D coordinate space of the user in accordance with the identified motion; and
(C) when the identified motion is a hand motion regarding the work movement with respect to a work target, outputting output information including information representing the work movement in accordance with the identified motion, wherein the type of motion corresponding to the switching motion is overlapping in which at least a part of one hand contacts at least a part of an other hand.

9. A work support method performed by an arithmetic apparatus, the method comprising:
displaying a 3D work-target object in a 3D coordinate space on a display device;
receiving a motion signal that is a signal representing a motion measured by any one of sensor units;
identifying the measured motion based on the motion signal by:
  identifying a type of the measured motion;
  identifying a type of movement corresponding to the identified type of motion;
  when the identified type of movement is a switching movement of switching between a spatial shift and a work movement, switching a current movement from the spatial shift to the work movement or from the work movement to the spatial shift;

when the identified type of movement is not the switching movement and the current movement is the spatial shift, identifying that the measured motion is a motion regarding the spatial shift; and when the identified type of movement is not the switching movement and the current movement is the work movement, identifying that the measured motion is a motion regarding the work movement;

when the identified motion is a motion regarding the spatial shift that is a shift of a viewpoint in the 3D coordinate space of a user, shifting the viewpoint in the 3D coordinate space of the user in accordance with the identified motion; and when the identified motion is a hand motion regarding the work movement with respect to a work target, outputting output information including information representing the work movement in accordance with the identified motion, wherein the sensor units include a remote controller, and wherein the type of motion corresponding to the switching movement is a predetermined motion using the remote controller.

\* \* \* \* \*